No. 32,102.  
J. DODGE.  
HARDENING SAW PLATES.  
PATENTED APR. 16, 1861.
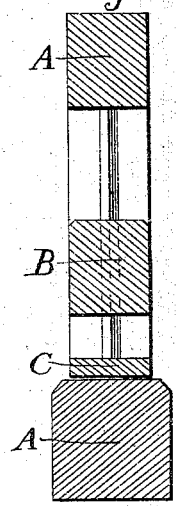
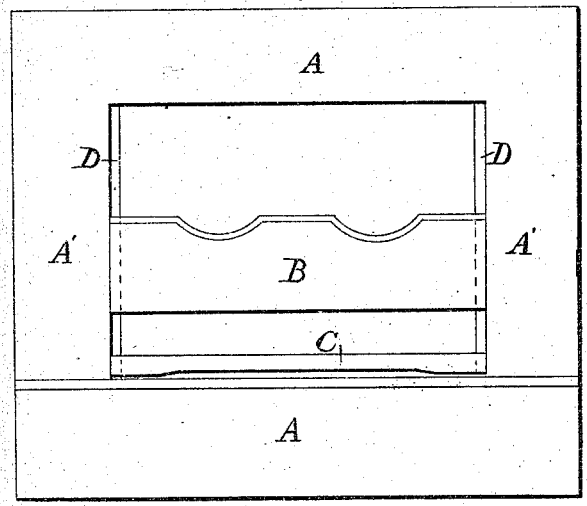
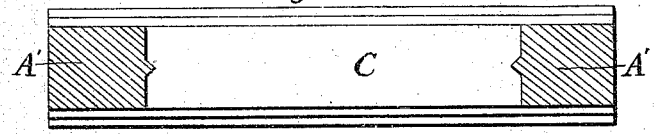
Witnesses:
Inventor:  
James Dodge.

UNITED STATES PATENT OFFICE.

JAMES DODGE, OF WATERFORD, NEW YORK, ASSIGNOR TO HIMSELF AND DAVID BLAKE, OF SAME PLACE.

HARDENING SAW-PLATES.

Specification of Letters Patent No. 32,102, dated April 16, 1861.

*To all whom it may concern:*

Be it known that I, JAMES DODGE, of Waterford, in the county of Saratoga and State of New York, have invented a new and useful Improvement for Hardening Saws and Plates of Metal; and I do hereby declare that the following is a full, clear, and exact description of the construction and operation of the same, reference being had to the annexed drawings, making a part of this specification, in which—

Figure 1 is an elevation, Fig. 2 a sectional and Fig. 3, a plan view.

Block A is a chill or block of metal of sufficient length and width upon which to place the saw or plate of metal to be hardened. On block A are placed two upright posts or pillars marked A' A' on which ways D, D, are constructed. Between said posts or pillars is placed a corresponding block of iron or chill marked B to be elevated by suitable machinery and held in its place and guided by said ways D D. On chill block A is placed an artificial elastic and flexible bed piece C the under surface of which is concave. It may, however, be a simple straight piece of steel with a yielding material placed underneath to give the requisite yielding surface.

The operations of the machine are as follows: The chill-block B is elevated as above specified, the saw or plate of metal to be hardened is placed on the artificial elastic bed piece C, the chill block B is then allowed to drop on the saw or plate of metal to be hardened and thereby hardening the same. After repeated operations the chill-blocks B and A become heated and expanded and thereby curved, the bed piece C by being flexible and elastic conforms to said chill blocks thereby covering and touching the whole of the surface of the saw or plate of metal to be hardened.

I do not claim the chill-blocks A and B, nor the pillars A' A' nor ways D, D, nor any device for raising or operating the machine, but What I do claim as my invention and desire to secure by Letters Patent is—

The artificial elastic and flexible bed piece C for the purpose described.

JAMES DODGE.

Witnesses:
W. P. CARTER,
MURRAY HUBBARD.